March 29, 1927.
D. J. DOLAN
1,622,424
MAKE AND BREAK DEVICE
Filed Nov. 28, 1921
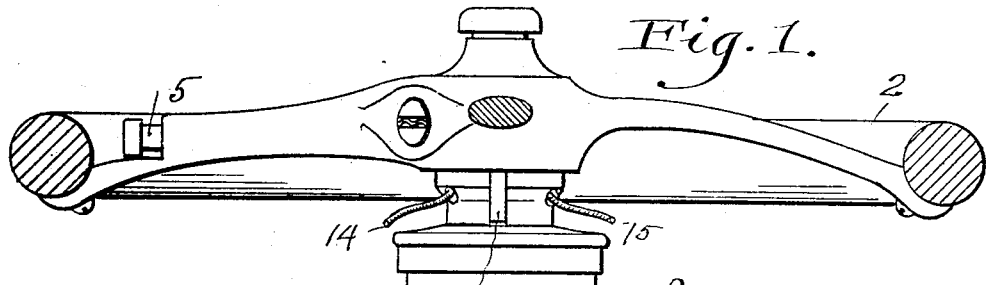
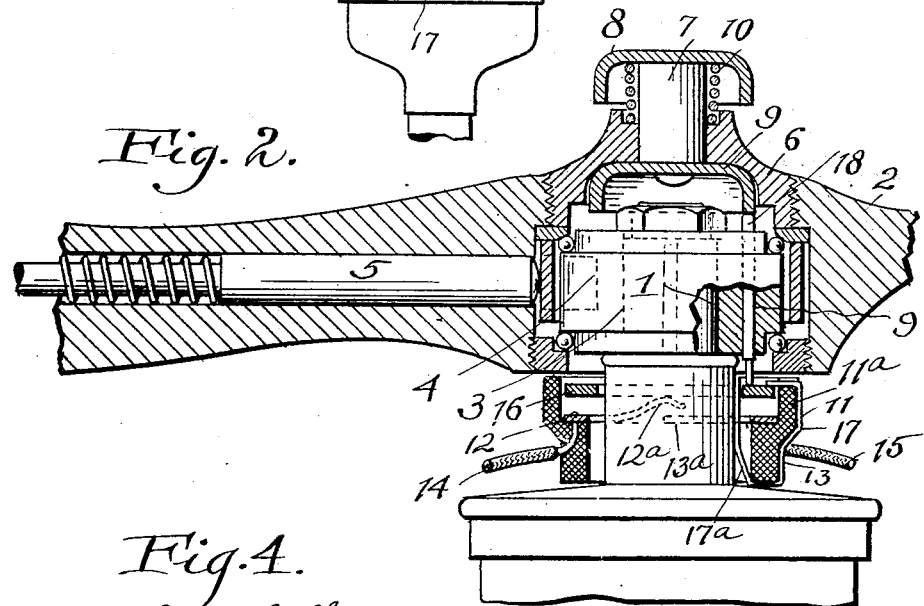
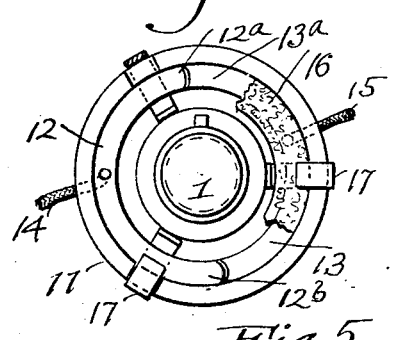
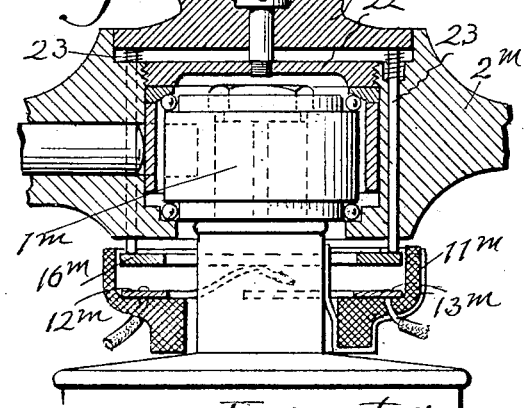
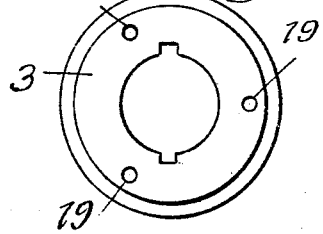
Inventor
David J. Dolan
by
Thurston Kivos + Hudson
attys.

Patented Mar. 29, 1927.

1,622,424

UNITED STATES PATENT OFFICE.

DAVID J. DOLAN, OF CLEVELAND, OHIO.

MAKE AND BREAK DEVICE.

Application filed November 28, 1921. Serial No. 518,345.

The present invention relates to a circuit make and break device, or what may be more restrictedly termed, a push button switch which is so constructed that the contact maker may be mounted so as to be capable of rotation relative to the structure which carries the circuit contacts.

The construction which is herein described is particularly adapted for use in connection with an automobile steering wheel where the wheel is adapted to be locked or unlocked with respect to the steering post. In such constructions it is absolutely essential, where the button for operating the horn or any other electric circuit is mounted on the hub of the wheel, that the switch device be capable of permitting the steering wheel to rotate, as otherwise the structure would be disrupted by the spinning of the steering wheel when the same is unlocked with respect to the steering post.

Reference should be had to the accompanying drawings forming a part of this specification, in which Fig. 1 is an elevation with portions in section showing a steering post, a wheel applied thereto, and including the present invention; Fig. 2 is a partial elevation and partial section; Fig. 3 is an elevation with parts in section of a modified form; Fig. 4 is a top plan view of the contact containing case; Fig. 5 is a top plan view of a part of the steering wheel.

For the purpose of disclosing the present invention, I have chosen a steering post and steering wheel construction which is exemplified in my pending application Serial No. 494,467, filed August 23, 1921.

However, I wish it to be understood that the present invention is not at all limited to the precise form in connection with which it is shown, as it is capable of being used in any construction where the steering wheel is mounted upon a steering post in such fashion that the steering wheel may be locked to the steering post or released from the steering post, under which latter condition this wheel may freely turn upon the steering post. Additionally, the device may be used wherever the construction used requires a make and break push button or similar device, which shall be rotatable with respect to the contacts which it operates for the purpose of completing an electric circuit.

Referring to the drawings, the steering column shown comprises the usual stationary outer casing and the inner rotatable steering post 1 upon which is mounted a steering wheel 2. The precise construction which is herein shown embodies a stationary member 3 which is directly mounted upon the steering post above the relatively stationary casing, and which member is provided with an aperture such as that indicated at 4 in dotted lines in Fig. 2, which aperture is adapted to receive the end of a bolt 5 carried by the steering wheel proper. When the bolt 5 occupies the recess 4 the steering wheel and steering post are operatively connected, and in that condition are capable of functioning as a steering mechanism. When the bolt 5 is withdrawn, as is shown in Fig. 2, the steering wheel proper may rotate with respect to the steering post.

The steering wheel hub receives the member 3 as before described, and the opening at the central part of the hub is closed by a cap 6. This cap has a central opening through which extends a post 7 which post at its outer end has a cupped button member 8, and the post 7 at its inner end has a cupped or saucer-shaped member 9. Surrounding the post 7 and at one end abutting against the inner side of the button 8 and at its other end abutting against the top of the cap 6 is a spring 10 which normally holds the button 8 in its outermost position.

Beneath the hub of the steering wheel 2 there is a contact carrying member 11. This contact carrying member has a central opening through which extends the steering post or the casing surrounding the same. This casing or contact carrying member is preferably made of non-conducting material, although this is not absolutely essential, but is a most convenient way of providing a construction so insulated that the contacts which are carried by the member 11 are insulated from the adjacent structure which is the desired situation.

The member 11 has a shoulder $11^a$, and upon this shoulder there are secured two pairs of contact members, or perhaps it might be more properly spoken of as two members which form double contacts.

One of the contact members is formed by a strip of metal 12 and has upward turned ends $12^a$ and $12^b$. The other contact member is indicated at 13, and one of its ends is indicated at $13^a$ in Fig. 2, and it may be stated that this end is similar to the other end of the member 13, and both ends of the member 13 extend beneath the upturned ends $12^a$ and 12ᵇ of the contact member 12. Therefore when the parts 12ᵃ and 12ᵇ of the contact member 12 are depressed into engagement with the contact member 13 the circuit is completed. Each of these contact members 12 and 13 is connected with a wire 14 and 15, which are wires included in the circuit controlled by the make and break device.

Within the members 11 and resting upon the upturned portions 12ᵃ and 12ᵇ is a depressible member 16 which is preferably made of insulating material, which member serves to depress the portions 12ᵃ and 12ᵇ into contact with the underlying parts of the contact member 13. This member 16 is normally pushed outwardly by the inherent resiliency in the upturned portions 12ᵃ and 12ᵇ of the contact member 12. The member 16 may be retained within the contact carrying member 11 in any suitable fashion, and for this purpose clips 17 are provided which have parts extending over and beyond the depressible member 16. Incidentally these clips are so fashioned that they retain the contact carrying members upon the steering post or column, and for this purpose are provided with a part which extends beneath the member 11 and upon the inside thereof, this part being indicated at 17ᵃ, and the part extends into contact with the steering post, thus acting as a resilient spacer so that the contact carrying member 11 will not rattle.

The co-operating means between the push button 8 and the depressible member 16 comprises the post 7, the cup member 9 and a plurality of pins one of which is indicated at 18, which extend through holes 19 in the member 3. These holes are more plainly shown in Fig. 5. The pins 18 are so positioned that at their upper ends they are engaged by the flange or edge of the cup member 9, while their lower ends rest upon the depressible member 16.

When the button member 8 is depressed the motion is communicated through the co-operating parts which have just been explained, to the depressible member 16 which, when depressed, will cause the contacts 12 and 13 to engage. When the button 8 is released the spring 10 returns it to its normal position while the inherent resiliency of the upturned end portions 12ᵃ, 12ᵇ, of the contact 12 returns the depressible member to its normal or up position.

In the commercial manufacture of such structures as here described it is difficult to obtain such a nice fit of the post 7 through the opening in the cap 6 as will cause the post 7 to reciprocate in a truly vertical direction. Additionally, by the continued use and depression of the button 8 there will be a wearing of the parts so that the post 7 will have a more or less sloppy fit through the opening in cap 6. Moreover, the driver of a car in pressing the button usually engages the button with the palm of the hand and is liable to strike the button unevenly or on the side. It will be seen that this will make no difference in the operation of the switch because the cup member 9 engages with the pins 18, which in turn engage with a plurality of parts, or in other words, different parts of the depressible member 16, and therefore even if the button 8 is pushed unevenly its motion will be communicated through one or more of the pins 18 to the depressible member and so cause the depression of the same. In fact, it will be quite desirable to have the post 7 with a loose fit in the cap 6 so that it will not bind if the edge of the button be pressed by a slanting depression rather than a vertical pressure.

Additionally it will be seen from the structure described that the wheel may freely turn with respect to the post upon which it is mounted, for the depressible member has no direct connection with the pins 18, nor has the cup member 9 any fixed connection with the pins 18, therefore relative rotation is permissible.

In Fig. 3 a slightly different structure is shown wherein the wheel 2ᵐ is mounted upon the post 1ᵐ. The construction whereby the wheel 2ᵐ may be locked to the steering post 1ᵐ remains the same in this construction as in the previous one. Additionally the contact carrying member 11ᵐ is the same as are the contact members 12ᵐ and 13ᵐ. These contact members just described are operated by a depressible member 16ᵐ.

Mounted at the upper end of the steering wheel is a button member 20. This button member is retained by means of a cap screw 21 which is threaded at its lower end into a member 22, which in turn is carried by the hub of the wheel. Pins 23 extend through suitable openings formed in the hub of the wheel, which pins at their upper ends engage with the lower surface of the button 20 and at their lower ends engage with the depressible member 16ᵐ, so that upon depression of the button 20 the depressible member 16ᵐ is depressed to operate the contacts 12ᵐ and 13ᵐ.

The same results and advantages are attained in the construction as shown in Fig. 3 as previously described with respect to the preceding figures.

Having described my invention, I claim:—

1. The combination with a steering wheel, a steering post on which the steering wheel is mounted, a member mounted upon said steering post and extending within the hub of the wheel, a depressible button mounted on the hub of the steering wheel, a contact carrying member associated with the steering post and below the wheel, contacts carried by said member, a depressible member associated with said contacts and serving when depressed to cause said contacts to engage, and means including a plurality of circumferentially spaced pins extending through the member carried by said steering post, said pins forming an operative connection between the button and said depressible member.

2. The combination with the rotatable steering wheel hub and post members, horn circuit controlling contacts associated with the post member below the wheel hub member, a depressible horn button centrally located on the upper portion of the wheel hub member, and operating connections between said button and said contacts extending through one of said members, said connections including a plurality of slidable pins circumferentially spaced around the wheel axis and at one end operated by said button, and an insulated ring operated thereby and surrounding the steering post member and arranged when operated to actuate said contacts.

In testimony whereof, I hereunto affix my signature.

DAVID J. DOLAN.